(No Model.)
C. L. COFFIN.
ELECTRIC METAL WORKING.
No. 483,427. Patented Sept. 27, 1892.
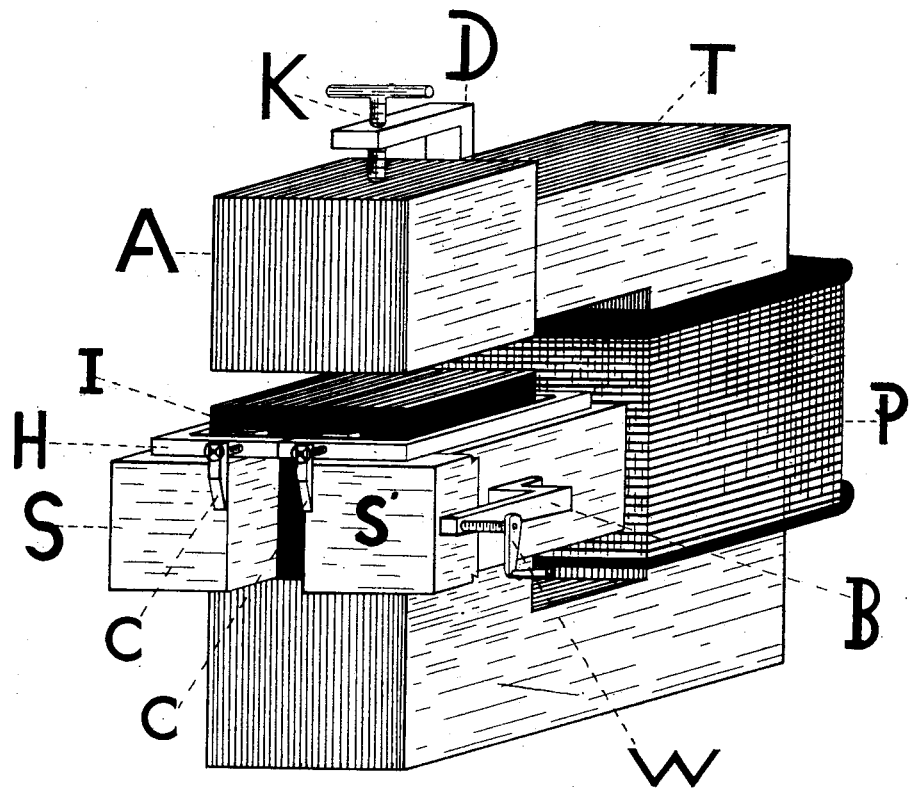
WITNESSES
Gertrude H. Anderson
Geo. H. Lothrop
INVENTOR
Charles L. Coffin.

UNITED STATES PATENT OFFICE.

CHARLES L. COFFIN, OF DETROIT, MICHIGAN.

ELECTRIC METAL-WORKING.

SPECIFICATION forming part of Letters Patent No. 483,427, dated September 27, 1892.

Application filed February 6, 1892. Serial No. 420,487. (No specimens.)

*To all whom it may concern:*

Be it known that I, CHARLES L. COFFIN, of Detroit, in the county of Wayne and State of Michigan, have invented a new and useful Improvement in Processes of Welding or Heating Metals Electrically, of which the following is a specification.

My invention consists of an improved process of welding or heating metals electrically, hereinafter fully described and claimed.

The drawing is a perspective of an apparatus by which my invention may be practiced.

T represents the core of a transformer or converter of known construction, of which P is the primary wound around the core, but insulated therefrom and connected with a generator of electrical currents, which may be either alternating, pulsating, vibrating, or intermittent.

A represents a portion of the core made movable.

D represents a bracket secured on core T and extending over the movable part A of said core.

K represents a screw-rod threaded through bracket D and swiveled into the movable part A of the core, by which said movable part may be raised to make a gap in said core.

S represents the secondary of the transformer, made heavy and purposely left incomplete—that is, with a gap in it, as shown in the figure.

C C represent two clamps secured on a secondary S at each side of the gap therein. On one side of the gap I make a part of the secondary (marked S') movable and control its movement in any desired way—as, for instance, by the bracket B, secured to secondary S and provided with a screw-rod or winch W, threaded through said bracket and swiveled into the movable part S' of the secondary S.

I represents insulation.

H represents a frame, or hoop, or band.

In welding the ends of a hoop or band or any continuous piece of metal by means of heating-currents traversing the joint the tendency of the current is to pass around the hoop, &c., instead of crossing the joint, and this tendency requires the interposition of some means to prevent the flow of current through the material. It is to obviate this difficulty that my invention is designed.

In proceeding to weld a continuous band or hoop, like H, I raise the movable part A of the core and lay the hoop or band H on the secondary S, bringing its ends in contact and clamping it to the secondary by the clamps C C. I usually lay the hoop or band H directly on the secondary, though insulation may be interposed between the secondary S and the band H, if desired, (except at the clamp extremities,) and in some cases it may be found advisable so to do. I now bring the movable part A of core T into contact with the core below it, so as to complete said core, and then pass alternating or pulsating or vibrating or intermittent currents through the primary P. This induces current of large volume and low electromotive force in the secondary S and in the band H, and, as the band is parallel with the secondary S and is, when no insulation is used, essentially a part of said secondary, the current in the secondary and in the band will be in the same direction, and the band will complete the secondary or bridge the gap therein, so that the current will tend to flow across the joint instead of tending to flow around the hoop or band. The result is that the ends of the band or hoop H are rapidly brought to a welding heat, when they may be pressed together by the winch W to form the weld, which may be thereafter worked or hammered in any desired manner, or the hoop or band H may be removed from the machine and welded or worked in any known way.

It is evident that the apparatus which I have illustrated may be varied in form or detail and these other forms used to practice my invention as well as the form illustrated.

What I claim as my invention, and desire to secure by Letters Patent, is—

1. The herein-described process of electrically welding the ends of a continuous piece of metal, consisting in closing a gap in the secondary of a transformer or converter by the ends of the piece to be welded, the said piece of metal lying parallel at all points to said secondary, passing suitable currents through the primary of the transformer, and pressing the ends of the piece together when raised to a welding heat.

2. An apparatus for electrically welding continuous metal bands, consisting of a converter having a broken secondary and means for inserting the piece to be welded within the core of the transformer, so as to complete said secondary, substantially as shown and described.

CHARLES L. COFFIN.

Witnesses:
GEO. H. LOTHROP,
GERTRUDE H. ANDERSON.